May 5, 1953
L. F. R. FELL
2,637,169
CONTROL FOR TRANSMISSION GEARING
IN MULTIENGINE POWER PLANTS
Filed Aug. 31, 1949
3 Sheets-Sheet 1
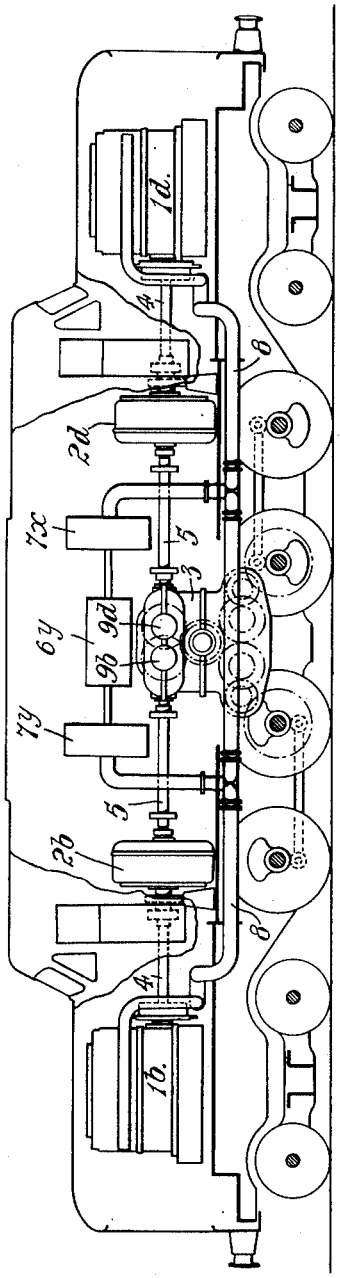
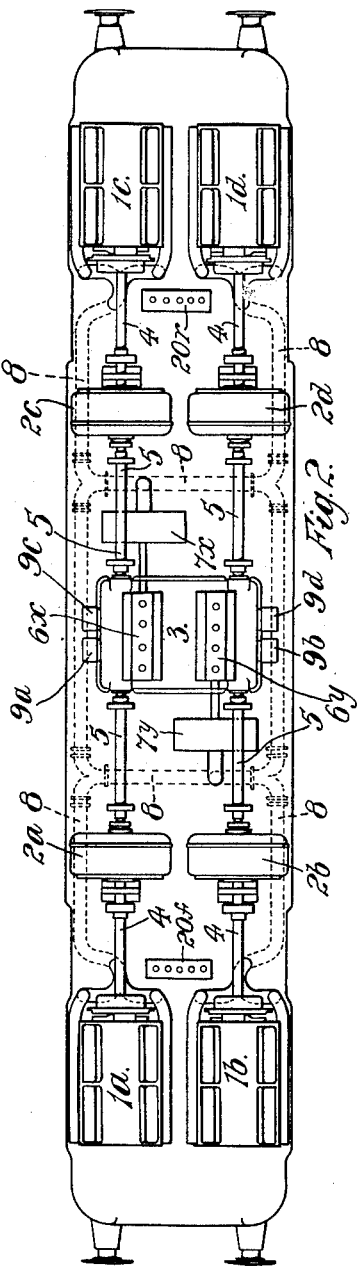
INVENTOR
Louis F. R. Fell
By
Atty.

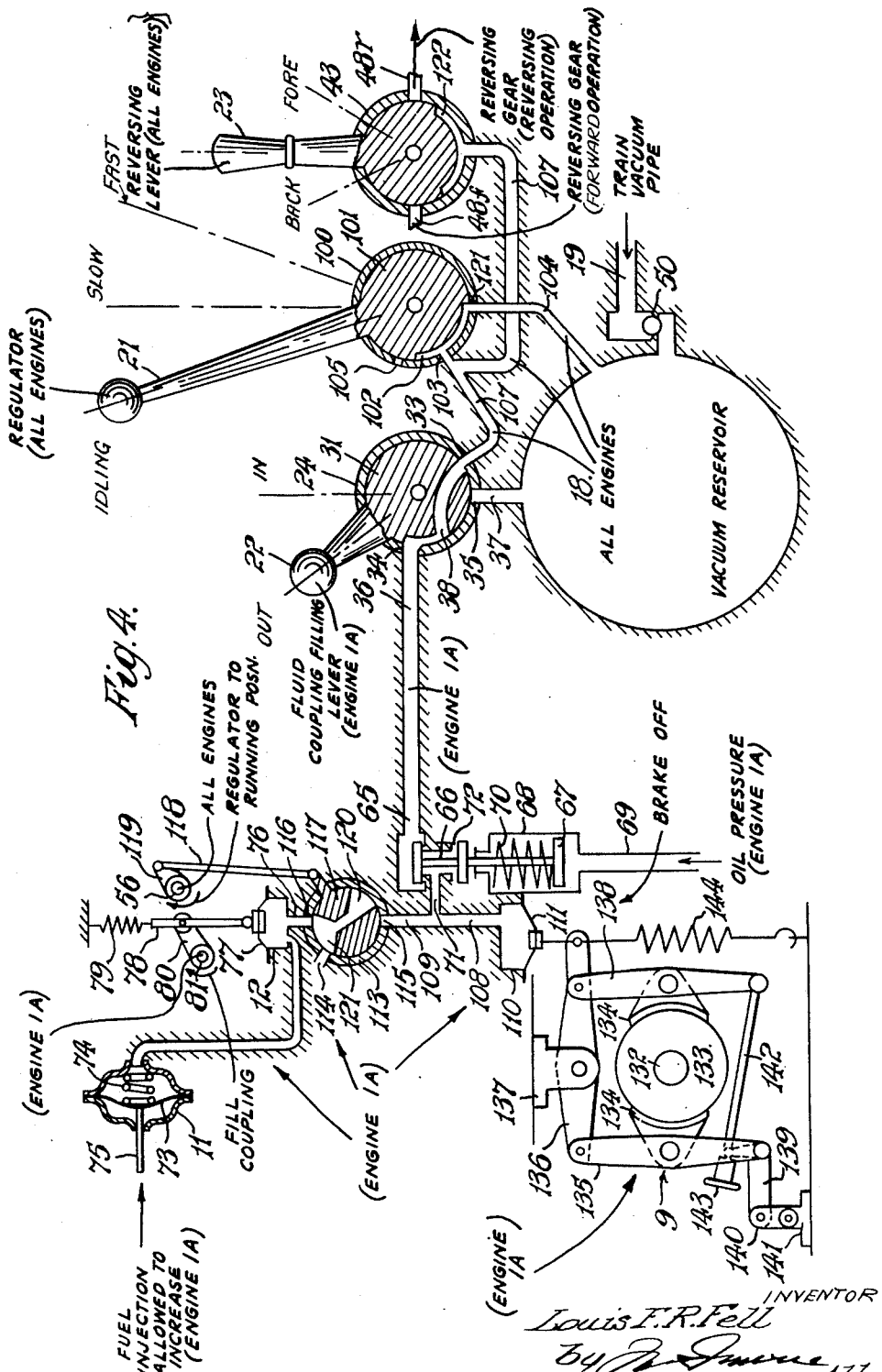

Patented May 5, 1953

2,637,169

UNITED STATES PATENT OFFICE 2,637,169

CONTROL FOR TRANSMISSION GEARING IN MULTIENGINE POWER PLANTS

Louis Frederick Rudston Fell, Littleover, England, assignor to Fell Developments Limited, London, England, a British company Application August 31, 1949, Serial No. 113,370
In Great Britain September 6, 1948

3 Claims. (Cl. 60—97)

1

This invention relates to a power plant of the kind comprising two main supercharged compression-ignition internal combustion engines each driving a sun wheel of a differential gear through a variable-filling fluid coupling having a manually operable filling control, a unidirectional device associated with each sun wheel permitting rotation thereof in one but not the other direction of rotation, and a governor associated with each main engine for controlling the fuel injection thereof in accordance with a predetermined torque/speed curve. Power plant of this kind is hereinafter referred to as "power plant of the kind referred to."

Such power plant is described and claimed, for example, in co-pending U. S. Patent application No. 793,903 filed December 26, 1947, in the name of L. F. R. Fell, now Patent No. 2,589,788. As fully described in that application, the output of the power plant is taken from the planet carrier of the aforesaid differential gear. If desired, two such plants may be combined, the planet carrier of each plant driving the sun wheels of a further differential gear, and so on.

When operating the plant to drive, for example, a locomotive, in order to start the locomotive from rest the fluid coupling associated with one of the main engines is filled and simultaneously the fuel injected into this engine is increased to enable the engine to develop its maximum torque. When the locomotive is running at a low speed, another fluid coupling is filled and the fuel injection of the associated main engine is increased. This increases the speed of the locomotive and the process is repeated for the other main engines in succession (where more than two main engines are provided). The speed of the locomotive can be controlled by regulating simultaneously the injection of all the engines for the time being supplying torque.

The purpose of the unidirectional devices referred to above is to enable the power plant to operate on one or more of the main engines while the remaining engine or engines is or are idling, the sun wheel of the or each idling engine being then held by its unidirectional device so that it acts as a fixed gear wheel. The unidirectional devices may take various forms but the present invention relates to the case in which each unidirectional device has the form of a self-wrapping brake so arranged that a brake shoe or shoes is or are lightly held against a brake drum rotating with the associated sun wheel and the resulting frictional force is utilised to cause the shoe or shoes to grip the drum if the latter

2 rotates in one direction but not if it rotates in the opposite direction. Where the power plant is in operation for long periods of time, as is the case, for example, in a locomotive, it is desirable to disengage the brake shoes of any brake entirely from its associated brake drum during periods when that brake is not required to operate, so that frictional resistance and the resulting wear and heating of the brake may be avoided.

In the power plant according to the invention, each brake is provided with disengaging means which, when operated, disengages the shoe or shoes of the said brake from the drum thereof, and operating means is provided which is arranged to operate the said disengaging means of any one brake when the main engine associated therewith is supplying torque to the output of the power plant and of all the brakes when all the main engines are idling. Thus the brake shoe or shoes of any brake is or are disengaged from the brake drum firstly when the associated main engine is supplying torque, and secondly when all the main engines are idling, in neither of which conditions is any reverse torque acting on the sun wheel in question.

The disengaging means of the brakes may be operated by the same controls as regulate the fuel injection of the main engines and the filling of the fluid couplings. The filling of each fluid coupling is controlled individually by the aforesaid manually operable filling control and the fuel injection of all the main engines is regulated simultaneously by a manually operable member, hereinafter termed the regulator, these controls and their interaction being fully described, for example, co-pending U. S. Patent application 113,369 filed August 31, 1949 in the name of L. F. R. Fell. In order to ensure correct actuation of the brake disengaging means each such means is arranged to be operated when the associated filling control is in the coupling-filling position and the regulator is in a running position (that is, a position in which the fuel injection is sufficient to enable the plant to run under load), and also when the associated filling control is in the coupling-emptying position and the regulator is in the idling position (that is, the position in which the fuel injection is reduced to the idling charge).

The movement of the regulator and the filling controls may be transmitted to the brake disengaging means, as also to the other control members of the plant by means of a vacuum, hydraulic or pneumatic transmission.

The invention is illustrated by way of example by the accompanying drawings, in which Figure 1 is a diagrammatic elevation with part of the cowling cut away of a railway locomotive having a power plant of the kind forming the subject of the aforesaid Patent No. 2,589,788.

Figure 2 is a plan view of the locomotive with the cowling removed,

Figure 4 is a fragmentary diagrammatic view of part of the control system associated with one of the main engines of the power plant.

Figure 3:
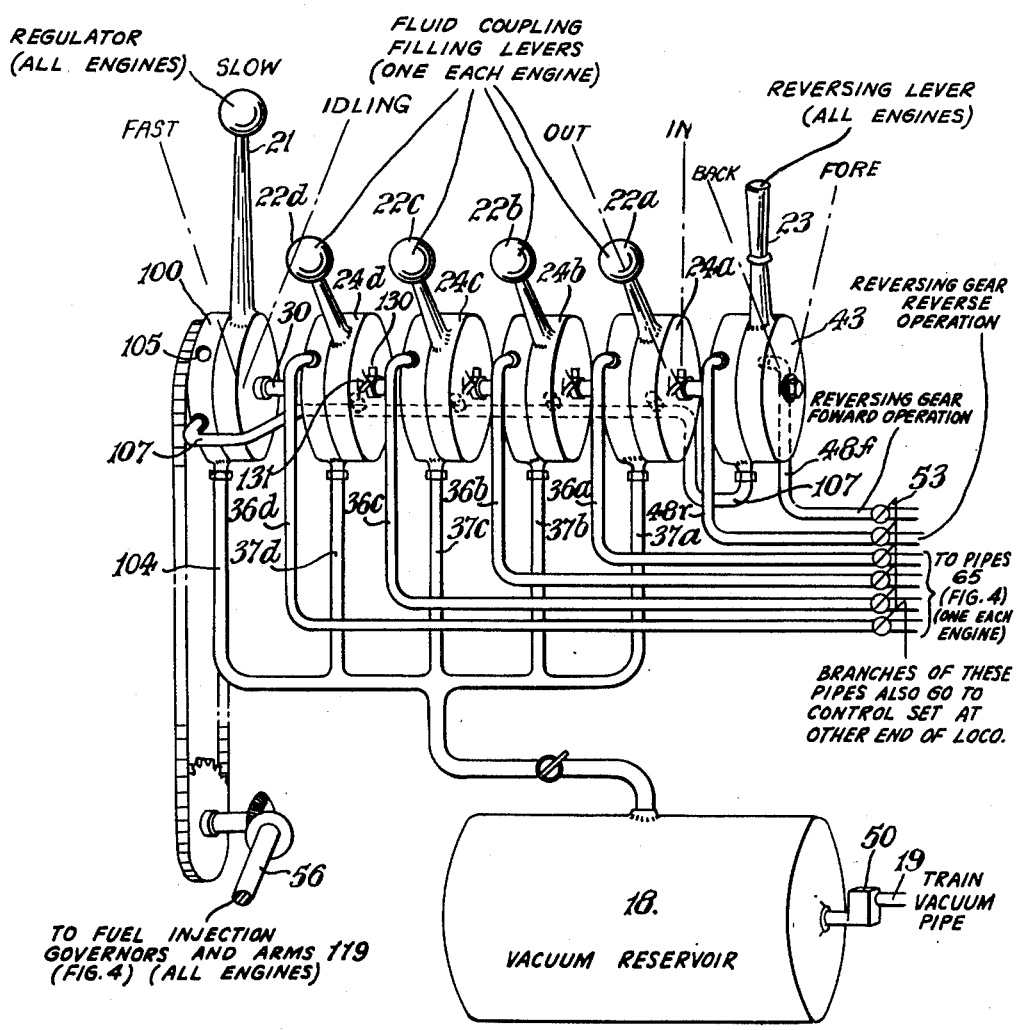
Figure 3 is a diagrammatic perspective view of a set of manual controls for controlling the power plant.

Figures 1 and 2 represent diagrammatically a railway locomotive driven by a power plant comprising four main compression ignition internal combustion engines 1a, 1b, 1c and 1d. These engines drive the sun wheels of two differential gears, through variable-filling fluid couplings 2a, 2b, 2c and 2d respectively. The differential gears and also the gears for transmitting the output thereof to the wheels of the locomotive are housed in a gear box 3. In this housing are a third differential gear the sun wheels of which are driven by the planet carriers of the two aforesaid differential gears, and a reversible transmission gear driven by the planet carrier of the third differential gear for transmitting the drive to the wheels of the locomotive. The shafts connecting the several main engines with their fluid couplings are all denoted by the reference numeral 4, and those connecting the fluid couplings with the gear box by the numeral 5.

Mounted on the gear box 3 are two auxiliary compression ignition internal combustion engines 6x and 6y. These engines drive blowers 7x and 7y respectively, the outputs of which are passed to a common duct system 8 connected with the inlet manifolds of the several main engines.

Each of the sun wheels driven by the shafts 5 is provided with a unidirectional self-wrapping brake 9a, 9b, 9c or 9d which permits the sun wheel to rotate in one direction but not in the other.

The operation of the power plant is regulated by a number of manual control levers through the medium of a vacuum as fully described in application No. 113,369. The vacuum system is not shown in Figures 1 and 2, but the part of the system associated with one of the main engines is shown in Figure 4, the parts of the system associated with the other main engines being identical.

A set of manual control levers is provided at each end of the locomotive and these sets are shown generally as 20f and 20r in Figure 2. One such set, namely 20f, is shown in Figure 3. Each set consists of a regulator 21 which is common to all the main engines, four fluid coupling filling control levers 22a, 22b, 22c and 22d, each associated with one of the main engines, and a reversing lever 23. Each filling control lever operates a valve 24a, 24b, 24c or 24d, the reversing lever operates a valve 43, and the regulator operates a valve 100.

In order to explain the action of the control system insofar as it relates to the disengaging means for the unidirectional brakes, reference will be made to Figure 4. In referring to this figure, it will be understood that the suffix letters, a, b, c, d, x, y, f and r are added to the reference numerals in the drawings and related description in order to denote association of the part in question with one of the main or auxiliary engines, or the front or rear end or forward or reverse direction of the locomotive. Where, as in the case of Figure 4, for example, a part is shown which is representative of a number of similar parts, it is denoted only by its reference numeral without the addition of a suffix letter. Likewise a group of such parts may be referred to in the text by the reference numeral without the suffix letters appropriate to the several members of the group.

The valve 24, comprises a valve body having ports 33, 34 and 35 which communicate with pipes 107, 36 and 37 respectively. Rotatable in the valve body is a valve plate 31 which is carried by the lever 22 and has a recess 38. When the lever 22 is in the position marked Out, this recess connects port 33 with port 34 and when the lever is in the position marked In, the recess connects port 35 with port 34. The valve 100 is similar to the valve 24, the valve body having a port 105, a port 103 and a port 121, and the valve plate 101 having a recess 102 as shown. Port 105 opens to atmosphere, port 103 communicates with pipe 107 and port 121 with pipe 104. When the regulator is in the Idling position, the recess 102 connects port 103 with port 121, and when the regulator is in a running position (that is the position marked Slow or Fast or an intermediate position) the recess 102 connects port 103 with port 105. Likewise the valve body of valve 43 has ports communicating with pipes 48f, 107 and 48r respectively and the valve plate has a recess 122 which connects pipe 107 with pipe 48f in the Fore position of the reversing lever 23, and with pipe 48r in the Back position of the lever.

A mechanical interlock, represented in Figure 3 by pins 130 on the shaft 30 to which the regulator is fixed and bosses 131 on the valve plates 31, prevents the levers 22 from being moved from the Out to the In position until the regulator 21 is moved from the Idling to a running position.

Pipes 37 and 104 are connected with a vacuum reservoir 18 which is itself connected in known manner with the train pipe 19 through a non-return valve 50. Each of the pipes 36a, 36b, 36c, 36d, 48f and 48r runs through the locomotive to the set of valves similar to the valves 24 comprised in the control set 20r. A cut-out valve is, however, provided in each pipe at each end of the locomotive adjacent to the respective sets of valves. The two sets of cut-out valves are each controlled by an arm 53f or 53r respectively (Figure 3).

The unidirectional brake 9 comprises a brake drum 133 mounted on the shaft 132 of one of the sun wheels contained in the gear box 3. Brake shoes 134 are pivoted on links 135 and 138 which are suspended from a rocking beam 136 pivoted on a support 137. The link 135 carries a bell crank lever 139 pivoted to its lower end. One end of the lever 139 is connected by a link 140 with an anchorage 141. The other end of the lever 139 is connected by a rod 142 with the link 138, to which it is pin jointed. An adjusting hand wheel 143 is screwed to the end of the rod 142 and bears against the short arm of the bell crank lever. A spring 144 tends to turn the beam 136 in a clockwise direction (as seen in Figure 4). It will be seen that such movement of the beam lifts the link 135, which turns the bell crank lever 139 in an anticlockwise direction, thus exerting a pull on the rod 142 and increasing the contact pressure of the shoes 134 on the drum 133. The tension of the spring 144 is sufficient to maintain the shoes in light contact with the drum as long as the shaft 132 is rotating in the anticlockwise direction. If, however, the shaft 132 rotates in the clockwise direction, the friction between the shoes and the drum causes the beam 136 to turn in a clockwise direction, with the result that the shoes firmly grip the drum and prevent rotation in this direction.

Connected with the beam 136 is a diaphragm 111 of a chamber 110. If this chamber is connected with vacuum, a force is exerted on the diaphragm which is sufficient to overcome the spring 144 and disengages the shoes 134 entirely from the drum 133. The force is not, however, sufficient to disengage the shoes if a clockwise torque is being sustained by the shaft 132.

The chamber 110 is connected with a pipe 108 which branches from a pipe 71 connected, via a valve 66, with a pipe 65. The latter pipe communicates with pipe 36. Also branching from pipe 71 is a pipe 109 which communicates with a port 115 in the valve 113. This valve has a further port 114 open to atmosphere and a port 116 communicating with a pipe 76. The latter pipe communicates with chambers 11 and 12 having diaphragms 73 and 77 respectively. Diaphragm 73 is urged by a spring 74 to the left (as seen in Figure 4) in which position a rod 75 cuts down the fuel injection to the main engine in question to the idling charge. Diaphragm 77 is urged upwards by a spring 79 and a rod 78. This rod is connected by a link 80 with a shaft 81, and clockwise movement of the shaft 81 from the position shown causes the associated fluid coupling to fill.

A valve member 117 is mounted so as to be rotatable in the valve 113 by means of a rod 118 which is pivoted to the valve member 117 at one end and at the other to an arm 119 fixed on a shaft 56 which is actuated by the regulator 21 (Figure 3). The valve member 117 is provided with recesses 120 and 121 as shown. When the regulator 21 is in the Idling position, the valve body closes the pipe 109, and the recess 121 opens to atmosphere the chambers 11 and 12. When the regulator 21 is moved to a running position, the shaft 56 turns in a clockwise direction, causing the valve member 117 to turn in the same direction. Communication is then established between the pipes 109 and 76, port 114 being cut off.

The valve 66 is actuated by a plunger 67 working in a cylinder 68 and urged downwards by a spring 70. The lower end of the cylinder is connected with the lubricating oil system of the main engine in question. In the position shown, the oil pressure is not sufficient to raise the valve 66, which therefore closes pipe 65 and opens pipe 71 via port 72 to atmosphere. If, however, the oil pressure reaches a value which is adequate for safe running of the engine from idling speed upwards, the plunger 67 and valve 66 are raised thus connecting pipe 65 with pipe 71 and closing the port 72 to atmosphere.

The operation of the system can now be described. When the regulator 21 is in the Idling position, all the filling control levers 22 must be in the Out position owing to the interlock described above. In these positions of the levers, vacuum is extended through pipe 104, recess 102, pipe 107, recess 38 and pipe 36 to pipe 65, and also through pipe 107, to valve 43. The reversing lever is set to the Fore or Back position according to the desired direction of movement of the locomotive and vacuum is extended to pipe 48f or 48r thus setting the reversing gear in the required sense. If the main engines are now started, they will idle and the resulting oil pressure will lift the valves 66. Vacuum is thus extended to the chambers 110, disengaging the unidirectional brakes 9. This condition obtains when the locomotive is stationary or coasting.

If the regulator is now moved to a running position, the connection between ports 103 and 121 is broken, and port 103 is connected with atmosphere via port 105. Atmospheric pressure is thus extended to pipes 36, 65, 71 and 108, and the shoes of the brakes 9 are restored to their operative positions. Movement of the regulator to a running position is normally followed by movement of one of the levers 22 to the In position. This connects pipe 36 with vacuum through recess 38 and pipe 37. The vacuum is extended to valve 113 and, owing to the movement of the regulator, the valve body 117 has turned to a position in which pipe 109 is connected with pipe 76. The vacuum therefore extends to the chambers 11 and 12 thus causing the fuel injection of the associated main engine to increase to a running valve and the fluid coupling to fill. At the same time the brake 9 is disengaged, since the vacuum also extends to chamber 110. Meanwhile, the brakes associated with the other main engines remain operative, thus preventing reverse rotation of these engines by the working engine. If, now, the lever 22 associated with one of the still idling engines is moved to the In position, this engine is likewise brought into the condition in which it can supply torque, and vacuum is extended to the associated chamber 110. As explained above, however, the vacuum will not be sufficient to disengage the brake until the output of the main engine in question is sufficiently high to overcome the reverse torque due to the already working engine.

When all the main engines have been brought in by operation of the several levers 22, all the brakes 9 are disengaged. If, however, one of the main engines stops, which stoppage either results from or causes a failure of the oil pressure of that engine, the valve 66 moves downwards, thus connecting pipe 71 with atmosphere. As a result, the associated fluid coupling empties and the brake 9 again becomes operative to prevent back rotation of the stopped engine.

As soon as the regulator 21 is moved to the running position, resulting in the connection of pipe 107 with atmosphere, vacuum is no longer applied to the valve 43, and the reversing gear cannot be operated. Means (not shown) may be provided to bring the reversing gear into a neutral position in which the locomotive wheels are free from the transmission when all the main engines are stopped, to enable the locomotive to be moved by another locomotive.

The conditions of operation described above also enable the driver of the locomotive to avoid the risk of locking the transmission, thus preventing operation of the reversing gear, when the locomotive rebounds from buffers. Normally the locomotive only comes into contact with the buffers when the regulator 21 is at Idling and the levers 22 are at Out. Under these conditions the brakes 9 are disengaged. If, however, it is necessary to bring the locomotive up to the buffers with the regulator in a running position and one engine working (that is one lever lever 22 at In) the brake associated with that engine is disengaged and this is sufficient to free the whole transmission. On making contact with the buffers, the driver must bring the regulator back to Idling before bringing the lever 22 to Out, since the reverse procedure would temporarily bring the brake into the operative position.

I claim:

1. In a power plant comprising two main supercharged compression-ignition internal combustion engines, a differential gear, a variable-filling fluid coupling associated with each main engine, means whereby each main engine drives a sun wheel of said differential gear through one of said fluid couplings, main engine control means whereby the torque of the main engines can be controlled separately or together, and, operative on the respective sun wheels, unidirectional self-wrapping brakes each having a brake drum and brake shoe means; brake control means which comprises a plurality of brake disengaging means, each associated with one self-wrapping brake and adapted when operated to disengage the shoe means from the drum of said brake, and means operatively connected with said main engine control means to operate said brake disengaging means of any one brake when the main engine associated therewith is supplying torque and of all the brakes when all the main engines are idling.

2. In a power plant comprising two main supercharged compression-ignition internal combustion engines, a differential gear, a variable filling fluid coupling associated with each main engine and each having a manually operable filling control, means whereby each main engine drives a sunwheel of said differential through one of said fluid couplings, a manually operable regulator for regulating the fuel injection of all the main engines simultaneously, and, operative on the respective sun wheels, unidirectional self-wrapping brakes each having a brake drum and brake shoe means; brake control means which comprises a plurality of brake disengaging means, each associated with one self-wrapping brake and adapted when operated to disengage the shoe means from the drum of said brake, and connecting means between said regulator, said fluid coupling filling controls and said brake disengaging means to operate the disengaging means of the brake associated with any one main engine when said filling control associated with said main engine is in the coupling-filling position and said regulator is in a position in which the fuel injection is sufficient to enable running of the power plant under load, and also when said filling control is in the coupling-emptying position and said regulator is in a position in which the fuel injection is only sufficient to allow idling of the main engines.

3. A control system according to claim 2, wherein said connecting means comprises a vacuum system.

LOUIS FREDERICK RUDSTON FELL.

References Cited in the file of this patent

UNITED STATES PATENTS

| Number | Name | Date |
|---|---|---|
| 1,953,486 | Kiep | Apr. 3, 1934 |
| 2,444,364 | Panish | June 29, 1948 |
| 2,457,568 | Larson | Dec. 28, 1948 |